US012652253B1

(12) United States Patent
Petersen et al.

(10) Patent No.: US 12,652,253 B1
(45) Date of Patent: Jun. 9, 2026

(54) TIME-BASED TOKEN BUCKET FOR CONTROLLING DATA RATE

(71) Applicant: Ethernovia Inc., San Jose, CA (US)

(72) Inventors: Brian Arnold Petersen, San Francisco, CA (US); Tom Quoc Wellbaum, San Jose, CA (US)

(73) Assignee: Ethernovia Inc., San Jose, CA (US)

( * ) Notice: Subject to any disclaimer, the term of this patent is extended or adjusted under 35 U.S.C. 154(b) by 299 days.

(21) Appl. No.: 18/069,316

(22) Filed: Dec. 21, 2022

Related U.S. Application Data

(60) Provisional application No. 63/265,799, filed on Dec. 21, 2021.

(51) Int. Cl.
H04L 47/215 (2022.01)

(52) U.S. Cl.
CPC .................................. H04L 47/215 (2013.01)

(58) Field of Classification Search
CPC .................................................... H04L 47/215
See application file for complete search history.

(56) References Cited

U.S. PATENT DOCUMENTS

| | | | | | |
|---|---|---|---|---|---|
| 7,310,314 | B1 * | 12/2007 | Katz | ........................ | H04L 45/00 |
| | | | | | 709/242 |
| 7,720,061 | B1 * | 5/2010 | Krishnaswamy | ....... | H04L 45/60 |
| | | | | | 370/392 |
| 7,873,048 | B1 * | 1/2011 | Kondapalli | ............. | H04L 47/30 |
| | | | | | 370/392 |
| 10,383,055 | B2 * | 8/2019 | Sen | ........................ | H04W 76/28 |
| 2009/0219815 | A1 * | 9/2009 | Insler | .................. | H04L 47/2433 |
| | | | | | 370/235 |
| 2010/0046373 | A1 * | 2/2010 | Smith | ..................... | H04L 47/21 |
| | | | | | 370/235.1 |
| 2011/0002228 | A1 * | 1/2011 | Pepper | .................... | H04L 47/50 |
| | | | | | 370/250 |
| 2014/0112147 | A1 * | 4/2014 | Esposito | ............... | H04L 47/215 |
| | | | | | 370/235.1 |
| 2014/0269399 | A1 * | 9/2014 | Patel | ........................ | H04L 43/10 |
| | | | | | 370/253 |
| 2014/0365800 | A1 * | 12/2014 | Kuroishi | ............ | G03G 15/5004 |
| | | | | | 713/323 |
| 2015/0236955 | A1 * | 8/2015 | Bottorff | .................. | H04L 47/33 |
| | | | | | 370/235 |
| 2015/0263969 | A1 * | 9/2015 | Mitsumori | .............. | H04L 49/90 |
| | | | | | 370/252 |
| 2016/0274822 | A1 * | 9/2016 | Iwasaki | .................. | G06F 3/1288 |
| 2017/0005939 | A1 * | 1/2017 | Tanisho | ................ | H04L 47/215 |
| 2017/0026295 | A1 * | 1/2017 | Yin | ......................... | H04L 47/12 |
| 2019/0140964 | A1 * | 5/2019 | Southworth | ............ | H04L 47/22 |
| 2020/0014486 | A1 * | 1/2020 | Harrang | ................ | H04B 17/309 |
| 2020/0053590 | A1 * | 2/2020 | Xu | ...................... | H04W 28/0257 |
| 2021/0014177 | A1 * | 1/2021 | Kasichainula | ........ | H04L 49/901 |
| 2021/0058328 | A1 * | 2/2021 | Xu | ..................... | H04W 72/0446 |
| 2021/0409158 | A1 * | 12/2021 | Kanamarlapudi | .... | H04L 1/1841 |
| 2023/0081344 | A1 * | 3/2023 | Wang | ...................... | H04L 47/33 |
| | | | | | 709/224 |

* cited by examiner

*Primary Examiner* — Abdelbasst Talioua

(74) *Attorney, Agent, or Firm* — Schwegman, Lundberg & Woessner, P.A.

(57) ABSTRACT

Various embodiments provide for time-based token bucket for controlling data rate, which can be used by a network device (e.g., multi-layered network device). An embodiment described herein can emulate accumulation of number of tokens (e.g., in a token bucket) using precision timestamps.

19 Claims, 5 Drawing Sheets

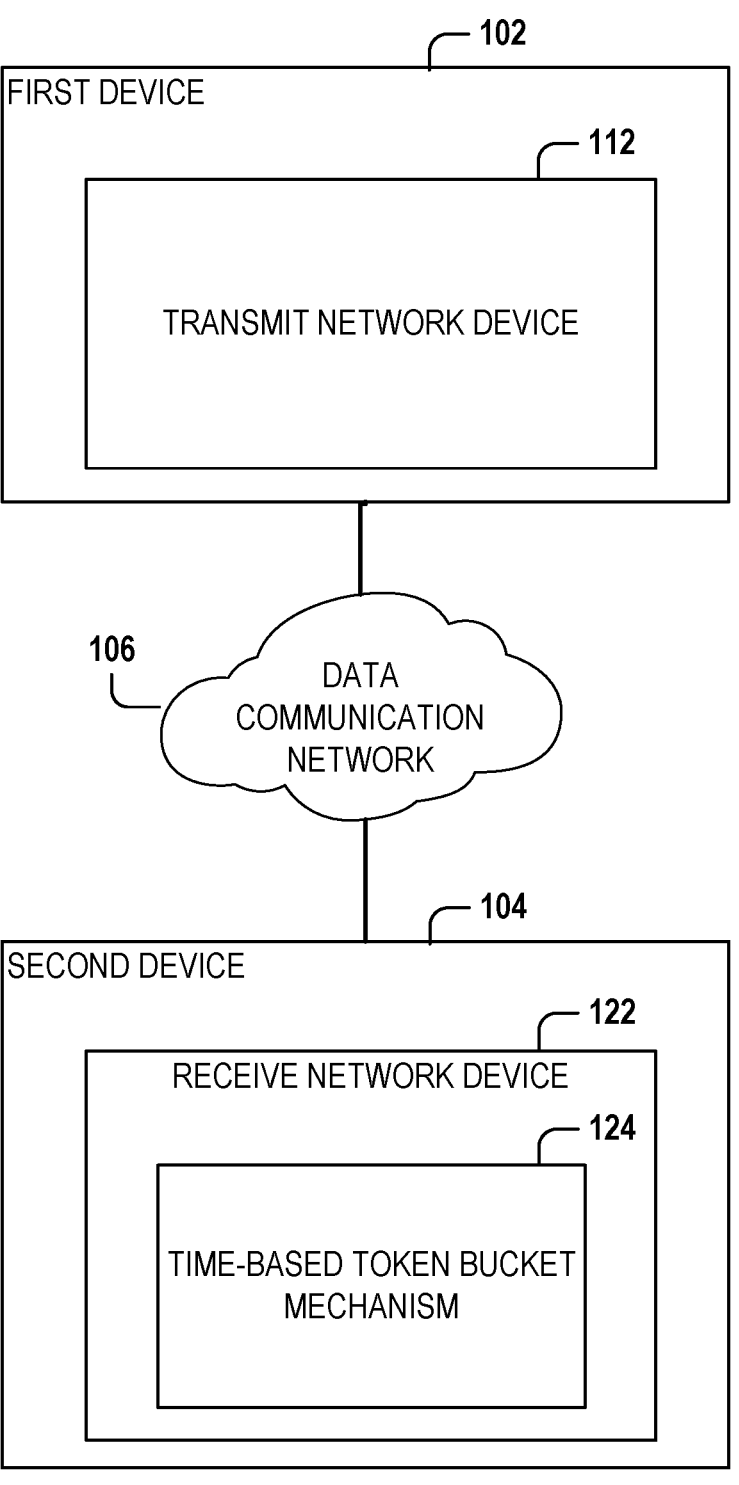
*FIG. 1*

200

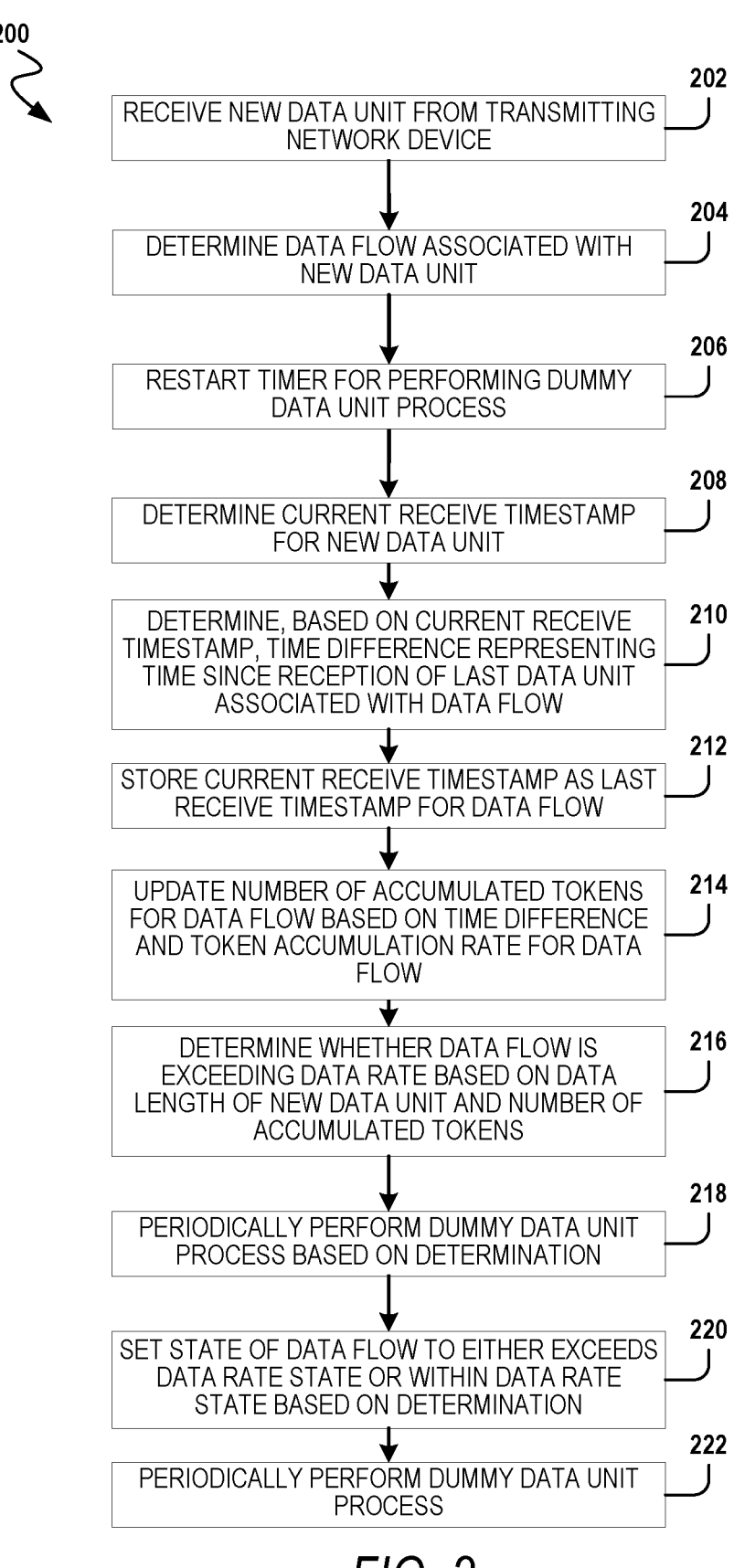

202
RECEIVE NEW DATA UNIT FROM TRANSMITTING NETWORK DEVICE

204
DETERMINE DATA FLOW ASSOCIATED WITH NEW DATA UNIT

206
RESTART TIMER FOR PERFORMING DUMMY DATA UNIT PROCESS

208
DETERMINE CURRENT RECEIVE TIMESTAMP FOR NEW DATA UNIT

210
DETERMINE, BASED ON CURRENT RECEIVE TIMESTAMP, TIME DIFFERENCE REPRESENTING TIME SINCE RECEPTION OF LAST DATA UNIT ASSOCIATED WITH DATA FLOW

212
STORE CURRENT RECEIVE TIMESTAMP AS LAST RECEIVE TIMESTAMP FOR DATA FLOW

214
UPDATE NUMBER OF ACCUMULATED TOKENS FOR DATA FLOW BASED ON TIME DIFFERENCE AND TOKEN ACCUMULATION RATE FOR DATA FLOW

216
DETERMINE WHETHER DATA FLOW IS EXCEEDING DATA RATE BASED ON DATA LENGTH OF NEW DATA UNIT AND NUMBER OF ACCUMULATED TOKENS

218
PERIODICALLY PERFORM DUMMY DATA UNIT PROCESS BASED ON DETERMINATION

220
SET STATE OF DATA FLOW TO EITHER EXCEEDS DATA RATE STATE OR WITHIN DATA RATE STATE BASED ON DETERMINATION

222
PERIODICALLY PERFORM DUMMY DATA UNIT PROCESS

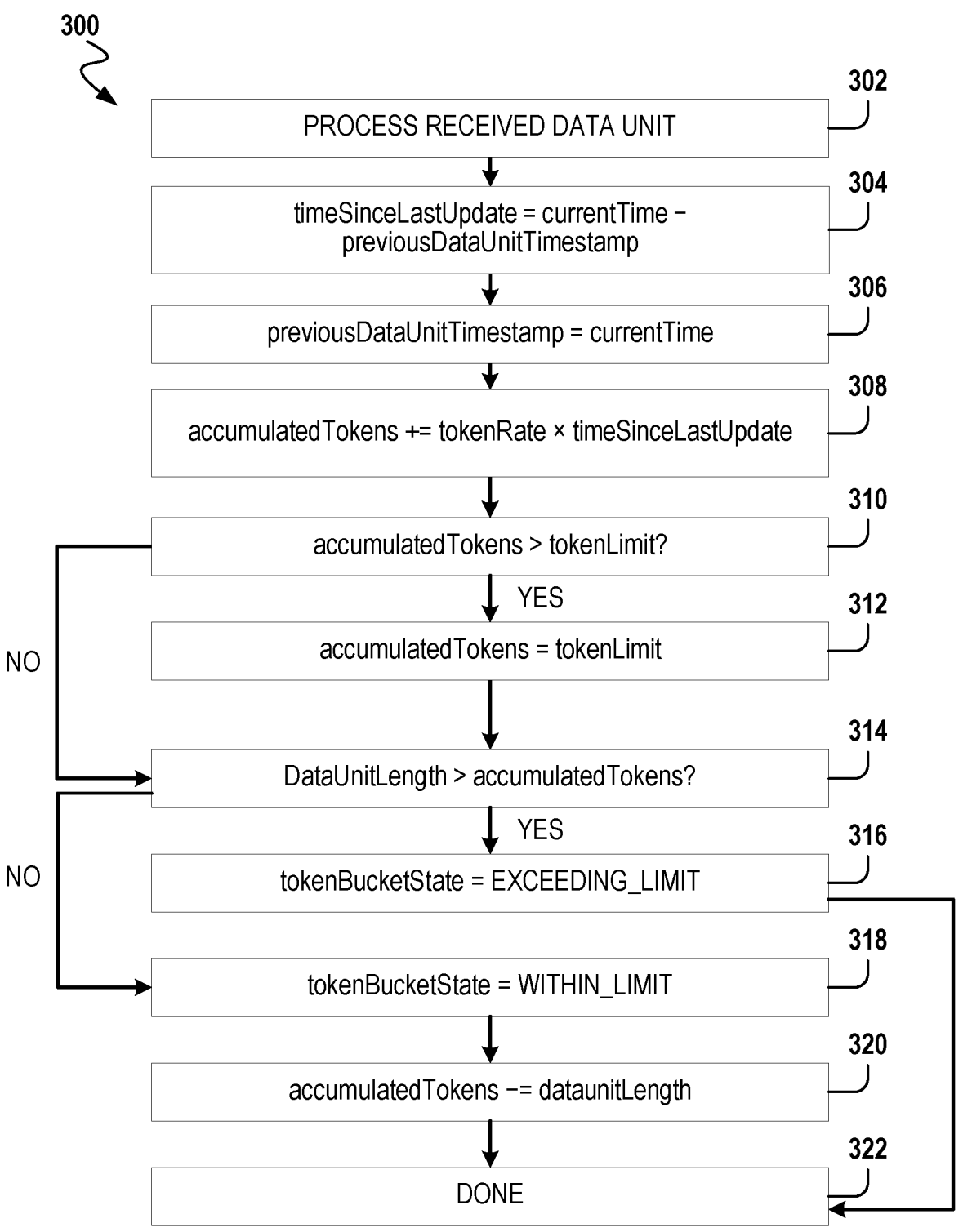

302 — PROCESS RECEIVED DATA UNIT

304 — timeSinceLastUpdate = currentTime − previousDataUnitTimestamp

306 — previousDataUnitTimestamp = currentTime

308 — accumulatedTokens += tokenRate × timeSinceLastUpdate

310 — accumulatedTokens > tokenLimit?

YES

312 — accumulatedTokens = tokenLimit

NO

314 — DataUnitLength > accumulatedTokens?

YES

316 — tokenBucketState = EXCEEDING_LIMIT

NO

318 — tokenBucketState = WITHIN_LIMIT

320 — accumulatedTokens −= dataunitLength

322 — DONE

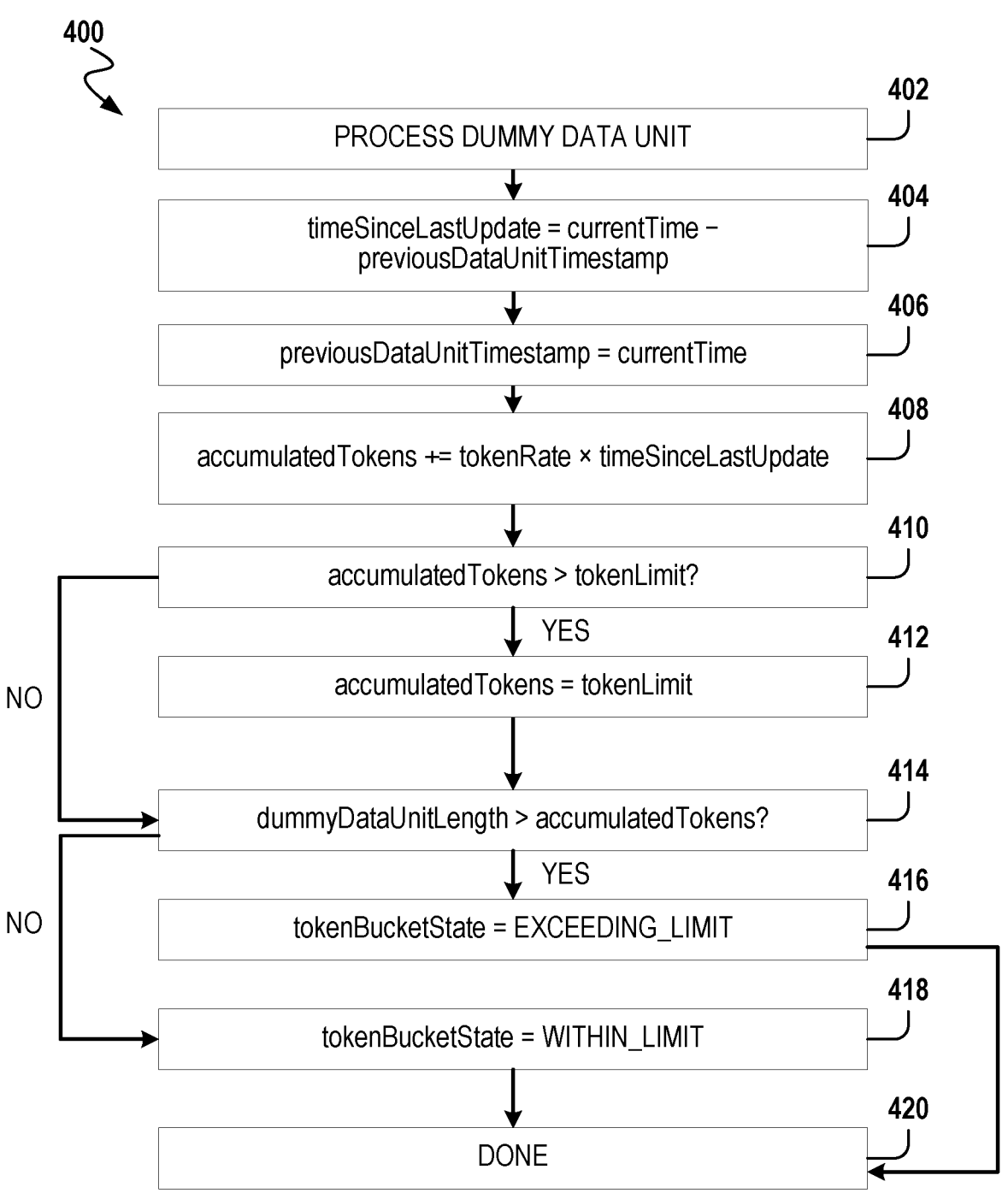

402 PROCESS DUMMY DATA UNIT 404 timeSinceLastUpdate = currentTime − previousDataUnitTimestamp 406 previousDataUnitTimestamp = currentTime 408 accumulatedTokens += tokenRate × timeSinceLastUpdate 410 accumulatedTokens > tokenLimit?

YES 412 accumulatedTokens = tokenLimit

NO 414 dummyDataUnitLength > accumulatedTokens?

YES 416 tokenBucketState = EXCEEDING_LIMIT

NO 418 tokenBucketState = WITHIN_LIMIT

420 DONE

*FIG. 4*

TIME-BASED TOKEN BUCKET FOR CONTROLLING DATA RATE

CROSS-REFERENCE TO RELATED APPLICATION

This application claims priority to and the benefit of U.S. Provisional Patent Application No. 63/265,799, filed on Dec. 21, 2021, which is incorporated herein by reference.

TECHNICAL FIELD

Embodiments described herein relate to data communications and, more particularly, to systems, methods, devices, and instructions relating to time-based token bucket for controlling data rate.

BACKGROUND

Communications networks allow for the exchange of data between various interconnected network devices. Data transmitted from one network device to another is a broken into smaller data units (e.g., data packets, data frames), which are each transmitted separately along a network path, over a data link, to their network destination. Each data unit can, for example, comprise an ordered set of individual values, such as a binary number made up of an ordered set of zeroes and ones (e.g., 0001, 0010, etc.) or contiguous groups of eight binary digits (bytes). The data units can be generated using various communication protocols or standards (e.g., Ethernet, Internet Protocol, (IP), User Datagram Protocol (UDP)) that define the rules, syntax and semantics for arranging a data unit. For example, a communication protocol may define a length of the data unit (e.g., number of individual values (bytes)), as well as identify the types of data that are to be stored in the various positions of the data unit, such as identifying the range of bytes (e.g., bytes 0-127) that store header data (e.g., one or more headers), transferred data (e.g., payload), or trailer. A data flow (or flow) of data units is a collection of receive context and addressing information associated with data units. For example, data units received with respect to a same receive port can be associated with a single data flow.

Token buckets are used by network devices to implement data rate control mechanisms, such as data unit policers or data unit shapers. Generally, a token bucket can comprise a counter that is incremented periodically such that the increment rate numerically matches the expected or allowed data rate (e.g., byte rate) for a data flow (e.g., packet flow) that is governed by a data rate control mechanism. For instance, the counter can be configured with a value that imposes an upper limit on the number of tokens that can be accumulated, and this limit can be at least high enough that the counter is greater than the longest supported data length for a data unit. When data rate controlling received data units, the data length of a just-received data unit can be compared with the count of the token bucket associated with the data flow associated with the received data unit. If the count is greater than or equal to the data unit's data length, the data unit is allowed to proceed and the count is decremented by the data unit's data length. Otherwise, the data unit is ignored or discarded and the counter is not decremented. For data unit transmission, a data unit's output queue is stalled until the token counter associated with the queue has reached at least the length of the data unit at the queue's head.

BRIEF DESCRIPTION OF THE DRAWINGS

Various ones of the appended drawings merely illustrate example embodiments of the present disclosure and should not be considered as limiting its scope.

FIG. 1 is a block diagram illustrating an example system that comprises a receive network device that includes a time-based token bucket mechanism, in accordance with some embodiments.

FIGS. 2 through 4 are flowcharts illustrating example methods for time-based token bucket for controlling data rate, in accordance with some embodiments.

DETAILED DESCRIPTION

Figure 5:
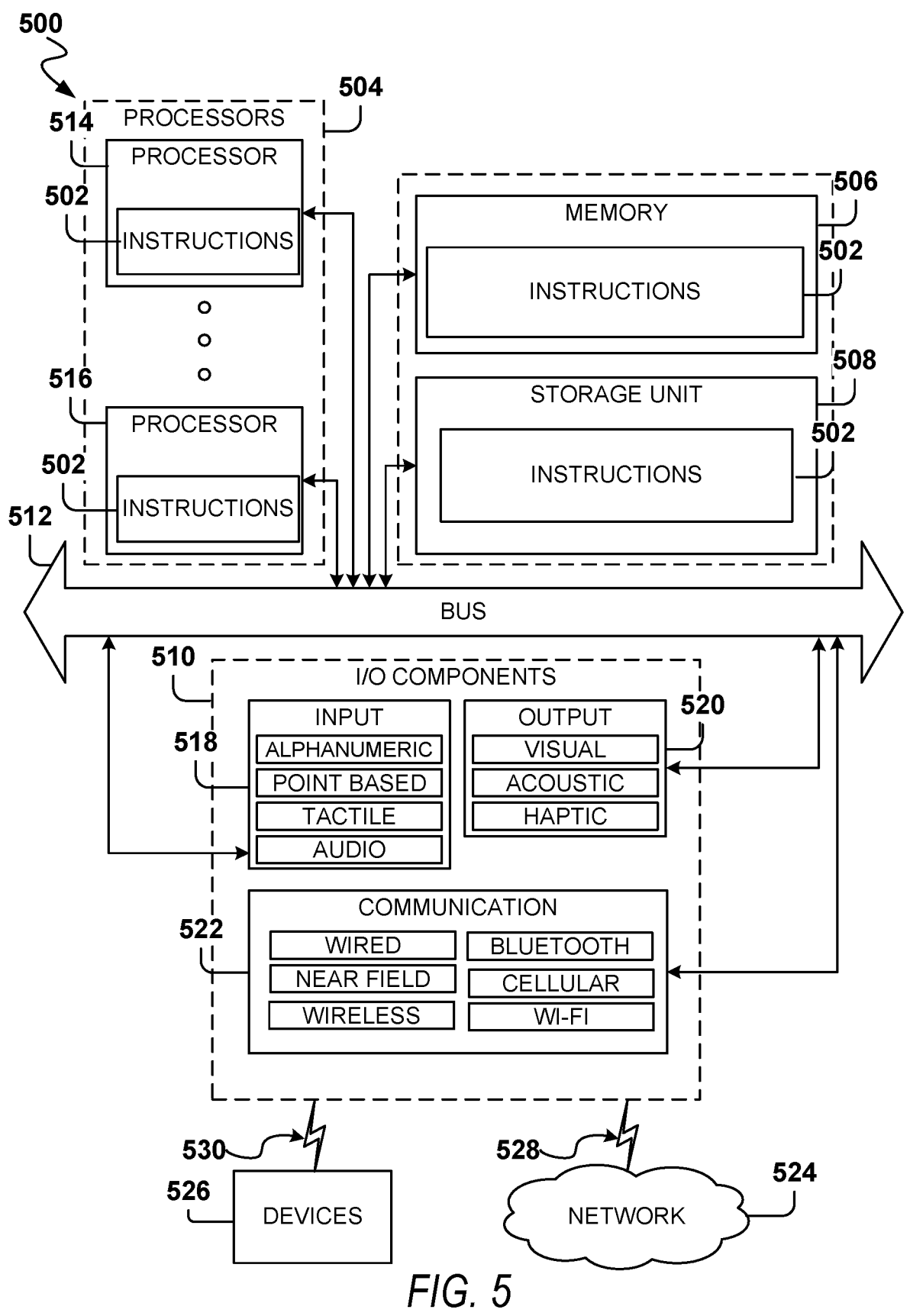
FIG. 5 is a block diagram illustrating components of an example machine that can use one or more embodiments discussed herein.

Conventional implementations of token buckets (e.g., token bucket counters) need to be periodically and systematically incremented by a value that represents the number of bytes per second since the time of the last update. For example, if a token bucket is configured for a 100 Mbps data rate (i.e., 12.5 Mbytes per second) and the token bucket counter can be accessed once every 10 microseconds, then it must be incremented by 125 each time. The access time of 10 microseconds dictates the return time of the token bucket (how often a token increment function can return to the token bucket to increment the count of tokens), which in turn dictates the granularity of the token bucket. In other words, the short-term accuracy of the token bucket-based time function is limited by the return time. In particularly large systems with tens of thousands of token buckets, it can take many tens or hundreds of microseconds between increment operations on the token bucket. On high-speed links, a long data unit (e.g., ~1K bytes) can have an on-the-wire duration of only about 20 nanoseconds, meaning that a single increment of a token bucket (associated with that the long data unit) can provide a token count sufficient for a thousand data units. In other words, a maximum-rate burst of a thousand data units would be allowed.

Additionally, conventional token bucket implementations face challenges when dealing with data units being received as a continuous burst at maximum rate. In particular, when data units (e.g., data packets) are received as a continuous burst at maximum rate, the burst applies pressure to a data unit queuing system of a network device and can lead to congestion-related data unit drops (e.g., data packet drops) or can require the data unit queuing system to be scaled up to accommodate such a burst (which increases cost and power consumption). For instance, a data unit policer function associated with a data unit's flow can be configured to allow no more than 50% of the maximum data rate. Due to the large delays between token accumulations in the token bucket associated with the data unit's flow, the policer allows periodic bursts of data units through to be enqueued, while the excess data units are dropped. Though the long-term average data rate of the data units (that make it past the policer and are actually enqueued) matches the configured 50%, the data units that are enqueued arrive in lengthy bursts, which is not desirable.

Various embodiments described herein address these and other deficiencies of conventional token bucket technologies. In particular, various embodiments described herein provide for time-based token bucket for controlling data rate, which can be used by a network device (e.g., multi-layered network device). Use of an embodiment described herein can address the granularity problem (faced by conventional technologies) by emulating accumulation of a number of tokens (e.g., in a token bucket) using precision timestamps. Various embodiments can be used with different types of data rate control mechanisms implemented by a network device, such as data unit policers, data unit shapers, or other applications that use precision data rate measurement or control.

According to some embodiments, as data units are received with respect to a given data flow, a timestamp is taken and stored in a storage element associated with the data flow. When a next data unit of the given data flow is received, the next data unit's timestamp can be compared to the stored timestamp to generate a time difference, where the time difference represents an elapsed time between a last data unit of the given data flow being received and the just-received data unit of the given data flow being received. The tokens for the given data flow can be accumulated (e.g., in a token bucket) on a continuous basis according to a token accumulation rate, which can be expressed in tokens per unit of time (e.g., tokens per a second). Accordingly, for some embodiments, the time difference (between the last data unit and the just-received data unit) is multiplied by the token accumulation rate to determine a number of tokens accumulated within the time difference, and the determined number is used to update (e.g., increment) the accumulated number of tokens (e.g., value in the token bucket) associated with the given data flow. If the accumulated number of tokens is greater than the data length of the just-received data unit, then the data unit is allowed to proceed and the data length of the just-received data unit is deducted (e.g., subtracted) from the accumulated number of tokens, otherwise the data unit is not allowed to proceed and the accumulated number of tokens is not changed.

For some embodiments, the token buckets are serviced by a background process (e.g., a dummy data unit process) that is guaranteed to make a complete tour of all token buckets and service them in a period of time that is smaller than the largest time value that can be represented by the timestamp. For each stored timestamp for an individual data flow, the background process can determine (e.g., take) a current timestamp, determine a time difference between the current timestamp and the stored timestamp for the individual data flow, and use the time different to determine (e.g., compute) and accumulate (e.g., add to an individual token bucket for the individual data flow) an appropriate number of tokens for the individual data flow. In a sense, the background process of some embodiments is submitting (e.g., processing) a series of zero-length data units on a periodic basis for all token buckets. In this way, an embodiment can ensure that all token buckets achieve high accuracy over a very large number of data flows regardless of the received data unit rate.

As used herein, a data flow (or flow) of data units is a collection of receive context and addressing information associated with data units. For instance, data units received via the same receive port of a network device can be associated with a single data flow, and the data flow identifier (or flow identifier) for the single data flow can comprise the associated receive port. Different data units can be associated with a same data flow. A data unit's membership to a flow may be approximate. It is permissible to group a number of discrete flows of packets together into a single flow, while it is not permissible to distribute packets of an indivisible flow into two or more separate flows.

As used herein, a token can represent a unit measure of data. For instance, one token can represent one byte of data or can represent one bit of data. Additionally, as used herein, a token bucket of a data flow can comprise a counter (e.g., stored in association with the data flow) that can be used to maintain (e.g., track or store) a count of tokens accumulated with respect to the data flow. For instance, the token bucket can comprise a byte-credit counter. A token bucket can be maintained by a network device on a per-data flow basis.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram illustrating an example system 100 that comprises a receive network device 122 that includes a time-based token bucket mechanism 124, in accordance with some embodiments. As shown, a first device 102 includes a transmit network device 112, and a second device 104 includes the receive network device 122. Depending on the embodiment, the first device 102, the second device 104, or each of both can be implemented (at least in part) by machine 500 of FIG. 5. For some embodiments, the time-based token bucket mechanism 124 implements time-based accumulation of tokens for a data flow (of data units) received by the receive network device 122 from the transmit network device 112.

A data communication network 106 operatively couples the first device 102 to the second device 104, where the data communication network 106 can support a data link between the first device 102 and the second device 104. The data communication network 106 can be implemented using a variety of network technologies, which can include different layers of network technology such, as Ethernet, Wi-Fi, TCP, InfiniBand, Internet Protocol (IP), and the like. The data communication network 106 can comprise one or more intermediate network devices operatively coupled between the transmit network device 112 of the first device 102 and the receive network device 122 of the second device 104. Each of the network devices 112, 122 can represent a multi-layer network device that implements features or methodologies described herein with respect to various embodiments.

FIGS. 2 through 4 are flowcharts illustrating example methods for time-based token bucket for controlling data rate, in accordance with some embodiments. It will be understood that example methods described herein may be performed by various components (e.g., functional or circuit components). For instance, the time-based token bucket mechanism 124 can cause the receive network device 122 described with respect to FIG. 1 to perform one or more methods 200, 300, 400. Depending on the embodiment, an operation of an example method described herein may involve intervening operations not shown. Additionally, though the operations of example methods may be depicted and described in a certain order, the order in which the operations are performed may vary among embodiments, including performing certain operations in parallel.

Referring now to the method 200 of FIG. 2, at operation 202, a receive network device (e.g., 122) receives a new data unit from a transmitting network device (e.g., 112). In response to receiving the new data unit, at operation 204, the receive network device (e.g., 122) determines a data flow associated with the new data unit. For example, the receive network device can receive the new data unit via a select receive port, the data flow can be associated with the select receive port, and the new data unit can be associated with the data flow based on the select receive port.

Additionally, in response to receiving the new data unit, at operation 206, the receive network device (e.g., 122) restarts (e.g., reinitializes) a timer that causes a dummy data unit process to be performed periodically with respect to a token bucket for the data flow. For various embodiments, the dummy data unit process is performed at a periodic rate to prevent rollover of a value of the last receive timestamp stored for the data flow, thereby safeguarding against time-stamp rollover. To implement a timer with respect to a given token bucket of a given data flow, the given token bucket/the given data flow can have a time-to-generate-next-dummy-packet parameter, which can be scanned (e.g., as part of a list of parameters for different data flows) to determine if the time value has passed for the given token bucket/the given data flow. Whenever an actual data unit for the data flow is received, the time-to-generate-next-dummy-packet parameter for the given token bucket/the given data flow is set to a value that is sufficiently far into the future.

At operation 208, the receive network device (e.g., 122) determines a current receive timestamp for the new data unit. At operation 210, the receive network device (e.g., 122) determines, based on the current receive timestamp, a time difference representing a time since reception of a last data unit associated with the data flow. In particular, operation 210 can comprise the receive network device accessing a last receive timestamp for the data flow, where the last receive timestamp represents a last time when the last data unit was received by the receive network device. The last receive timestamp can be accessed from a storage location associated with the data flow. Operation 210 can comprise the receive network device determining the time difference by subtracting the last receive timestamp from the current receive timestamp. Eventually, at operation 212, the receive network device (e.g., 122) stores the current receive timestamp as (e.g., in place of) the last receive timestamp for the data flow. For some embodiments, the current receive timestamp is stored at a storage location associated with the data flow.

During operation 214, the receive network device (e.g., 122) updates a number of accumulated tokens for the data flow based on the time difference and a token accumulation rate for the data flow. For some embodiments, the number of accumulated tokens is stored or otherwise tracked in a token bucket for the data flow, which can be implemented by a counter (e.g., token counter). Additionally, for some embodiments, the token accumulation rate represents a data rate allowed by the receiving network device for the data flow. Accordingly, the unit measure of data represented by a token is the same unit measure of the data rate.

For various embodiments, operation 214 comprises the receive network device determining an update value by multiplying the time difference by the token accumulation rate, and adding the update value to the number of accumulated tokens. Additionally, after adding the update value to the number of accumulated tokens, the receive network device can determine whether the number of accumulated tokens exceeds a predetermined limit (e.g., predetermined token limit). In response to determining that the number of accumulated tokens exceeds the predetermined limit, the receive network device can set the number of accumulated tokens to the predetermined limit.

At operation 216, the receive network device (e.g., 122) determines whether the data flow is exceeding the data rate based on a data length of the new data unit and the number of accumulated tokens. For some embodiments, operation 216 comprises the receive network device comparing the data length of the new data unit to the number of accumulated tokens. In response to the data length being less than the number of accumulated tokens, the receive network device can determine that the data flow is exceeding the data rate, otherwise the receive network device determines that the data flow is not exceeding the data rate. As described herein, each token accumulated represents a unit measure of data, such as a bit or a byte.

At operation 218, the receive network device (e.g., 122) deducts (e.g., subtracts) the data length of the new data unit from the number of accumulated tokens in response to determining that the data flow is not exceeding the data rate at operation 216.

Thereafter, during operation 220, the receive network device (e.g., 122) sets a state of the data flow to either an exceeds data rate state or a within data rate state based the determination made at operation 216. During operation 216, the receive network device sets the data flow to the exceeds data rate state in response to determining that the data flow is exceeding the data rate at operation 216, and the data flow to the within data rate state in response to determining that the data flow is not exceeding the data rate at operation 216. For some embodiments, the exceeds data rate state for the data flow causes the network device to not allow the new data unit, and the within data rate state for the data flow causes the network device to allow the new data unit. Additionally, as long as the data flow remains in the exceeds data rate state, the receive network device can continue to not allow data units subsequently received for the data flow. As long as the data flow remains in the within data rate state, the receive network device can continue to allow data units subsequently received for the data flow.

For operation 222, the receive network device (e.g., 122) periodically performs the dummy data unit process. For some embodiments, the receive network device periodically performs the dummy data unit process with respect to a given token bucket for the data flow based on a timer, which can be the same timer as the one restarted by operation 206. For various embodiments, the dummy data unit process is performed at a periodic rate to prevent rollover of a value of the last receive timestamp stored for the data flow, thereby safeguarding against undetected time value wraparounds (owing to the narrowness in the data width of timestamps used). Once initiated, the dummy data unit process can cycle through token buckets for each data flow. For some embodiments, the dummy data unit process is similar to the process performed for receiving non-dummy data units, but without the deduction (e.g., subtraction) of the dummy data unit's data length from token buckets. For instance, the dummy data unit process can comprise the receive network device determining a current dummy timestamp based on a current time. The receive network device can determine, based on the current dummy timestamp, a second time difference between the current dummy timestamp and a last receive timestamp for the data flow. The receive network device can update the number of accumulated tokens for the data flow based on the second time difference and the token accumulation rate for the data flow, and can store the current dummy timestamp as (e.g., in place of) the last receive timestamp for the data flow. The receive network device can determine whether the data flow is exceeding the data rate based on a dummy data length for a dummy data unit and the number of accumulated tokens. The receive network device can set the state of the data flow to either the exceeds data rate state or the within data rate state based on the determining whether the data flow is exceeding the data rate based on the dummy data length and the number of accumulated tokens. For some embodiments, the dummy data unit is not a real data unit, and the dummy data length is set to (e.g., configured to be) a nominal value, which can be based on the rate of periodic accumulation to ensure that not too many data units are discarded or allowed.

Referring now to the method 300 of FIG. 3, the method 300 represents an example implementation for processing received data units. When a data unit for a given data flow is received at operation 302, the time since the reception of the last data unit (timeSinceLastUpdate) for the given data flow is determined by computing timeSinceLastUpdate=currentTime−previousDataUnitTimestamp at operation 304, where currentTime is the current time and previousDataUnitTimestamp is the time stamp of the previous (e.g., last) data unit received for the given data flow. Operation 304 can take into account the rollover of the relatively narrow timestamp values so that a correct time difference can be computed. As described herein, a dummy data unit process can ensure that the previous data unit timestamp is never too far into the past. At operation 306, the value of previous data unit timestamp (previousDataUnitTimestamp) is replaced by the value of the current time.

At operation 308, the time difference (timeSinceLastUpdate) is multiplied by the token accumulation rate (tokenRate) (e.g., the allowed byte rate) to yield the number of tokens that should have accumulated since the reception of the last data unit, and this number of tokens is added to the accumulator (accumulatedTokens), which represents the token bucket for the given data flow.

If at operation 310, it is determined the accumulator (accumulatedTokens) has reached an accumulation limit (tokenLimit), then the accumulator (accumulatedTokens) is clipped to that limit at operation 312 and the method 300 proceeds to operation 314. If at operation 310 it is determined the accumulator (accumulatedTokens) has not reached an accumulation limit (tokenLimit), the method 300 can proceed to operation 314.

If at operation 314 it is determined that data length of the data unit (DataUnitLength) is greater than the number of accumulated tokens (accumulatedTokens), then at operation 316 the token bucket's state is set to reflect that the receive data rate is exceeding the token bucket's configured limit (tokenBucketState=EXCEEDING_LIMIT). After operation 316, the method 300 proceeds to operation 322, where the method 300 is done.

If at operation 314 it is determined that data length of the data unit (DataUInitLength) is not greater than the number of accumulated tokens (accumulatedTokens), the method 300 can proceed to operation 318. At operation 318, the token bucket's state is set to reflect that the receive data rate is within the bucket's configured limit (tokenBucketState=WITHIN_LIMIT) and, at operation 320, the data unit's length (dataunitlength) (e.g., in bytes) is subtracted from the token accumulator (accumulatedTokens−=dataunitLength). After operation 320, the method 300 proceeds to operation 322, where the method 300 is done.

Referring now to the method 400 of FIG. 4, the method 400 represents an example implementation for processing dummy data units. For various embodiments, the method 400 is performed as a background process that is automatically launched at a rate that ensures that, in the absence of actual data units, the timestamp value does not roll over and result in inaccurate time computations (e.g., time since last data unit). The method 400 can trigger the accumulation of tokens in the normal manner and set of previousDataUnitTimestamp (the time stamp of the previous (e.g., last) data unit received for the given data flow) for a given data flow to currentTime (the current time), thereby ensuring that the gap between currentTime and previousDataUnitTimestamp is never great enough to risk a rollover (e.g., the gap is never allowed to exceed the maximum time value that currentTime can hold). Method 400 To update the token bucket's state so that it returns a rational value when queried, a dummy data unit of some nominal length (e.g., configurable value) is tested against the token accumulator (at operation 412). However, unlike method 300, the dummy data unit's length is not subtracted from the token accumulator by the method 400. As described herein, the dummy data unit is not a real data unit, and the dummy data length is set to (e.g., configured to be) a nominal value, which can be based on the rate of periodic accumulation to ensure that not too many data units are discarded or allowed.

The method 400 starts at operation 402 by processing a dummy data unit. At operation 404, the time since the reception of the last data unit (timeSinceLastUpdate) for the given data flow is determined by computing timeSinceLastUpdate=currentTime−previousDataUnitTimestamp, where currentTime is the current time and previousDataUnitTimestamp is the time stamp of the previous (e.g., last) data unit received for the given data flow. At operation 406, the value of previous data unit timestamp (previousDataUnitTimestamp) is replaced by the value of the current time.

At operation 408, the time difference (timeSinceLastUpdate) is multiplied by the token accumulation rate (tokenRate) (e.g., the allowed byte rate) to yield the number of tokens that should have accumulated since the reception of the last data unit, and this number of tokens is added to the accumulator (accumulatedTokens), which represents the token bucket for the given data flow.

If at operation 410, it is determined the accumulator (accumulatedTokens) has reached an accumulation limit (tokenLimit), then the accumulator (accumulatedTokens) is clipped to that limit at operation 412 and the method 400 proceeds to operation 414. If at operation 410 it is determined the accumulator (accumulatedTokens) has not reached an accumulation limit (tokenLimit), the method 400 can proceed to operation 414.

If at operation 414 it is determined that data length of the dummy data unit (dummyDataUnitLength) is greater than the number of accumulated tokens (accumulatedTokens), then at operation 416 the token bucket's state is set to reflect that the receive data rate is exceeding the token bucket's configured limit (tokenBucketState=EXCEEDING_LIMIT). After operation 416, the method 400 proceeds to operation 420, where the method 400 is done.

If at operation 414 it is determined that data length of the dummy data unit (dummyDataUnitLength) is not greater than the number of accumulated tokens (accumulatedTokens), the method 400 can proceed to operation 418. At operation 418, the token bucket's state is set to reflect that the receive data rate is within the bucket's configured limit (tokenBucketState=WITHIN_LIMIT). After operation 418, the method 400 proceeds to operation 420, where the method 400 is done.

FIG. 5 is a block diagram illustrating components of an example machine 500 that can use one or more embodiments discussed herein. Specifically, FIG. 5 shows a diagrammatic representation of the machine 500 in the example form of a system, within which instructions 502 (e.g., software, a program, an application, an applet, an app, a driver, or other executable code) for causing the machine

500 to perform one or more operations that may make use of one or more of the methodologies discussed herein. For example, the instructions 502 include executable code that causes the machine 500 to execute one or more operations that cause a network device (e.g., multi-layered network device) of the machine 500 (e.g., embodied by communication components 522) to perform the methods 200, 300, 400. The machine 500 may be coupled (e.g., networked) to other machines.

By way of non-limiting example, the machine 500 may comprise or correspond to a television, a computer (e.g., a server computer, a client computer, a personal computer (PC), a tablet computer, a laptop computer, or a netbook), a personal digital assistant (PDA), a smart phone, a mobile device, or any machine capable of executing the instructions 502, sequentially or otherwise, that specify actions to be taken by the machine 500. Further, while only a single machine 500 is illustrated, the term "machine" shall also be taken to include a collection of machines 500 that individually or jointly execute the instructions 502.

The machine 500 may include processors 504, memory 506, a storage unit 508, and I/O components 510, which may be configured to communicate with each other such as via a bus 512. In some embodiments, the processors 504 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 514 and a processor 516 that may execute the instructions 502. The term "processor" is intended to include multi-core processors 504 that may comprise two or more independent processors (sometimes referred to as "cores") that may execute instructions 502 contemporaneously. Although FIG. 5 shows multiple processors 504, the machine 500 may include a single processor with a single core, a single processor with multiple cores (e.g., a multi-core processor), multiple processors with a single core, multiple processors with multiple cores, or any combination thereof.

The memory 506 (e.g., a main memory or other memory storage) and the storage unit 508 are both accessible to the processors 504 such as via the bus 512. The memory 506 and the storage unit 508 store the instructions 502. The instructions 502 may also reside, completely or partially, within the memory 506, within the storage unit 508, within at least one of the processors 504 (e.g., within the processor's cache memory), or any suitable combination thereof, during execution thereof by the machine 500. Accordingly, the memory 506, the storage unit 508, and the memory of the processors 504 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 502. The term "machine-readable medium" shall also be taken to include any medium, or combination of multiple media, that is capable of storing instructions (e.g., instructions 502) for execution by a machine (e.g., machine 500), such that the instructions, when executed by one or more processors of the machine (e.g., processors 504), cause the machine to perform one or more operations that makes use of one or more of the methodologies described herein (e.g., the methods 200, 300, 400). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 510 may include a wide variety of components to receive input, provide output, produce output, transmit information, exchange information, capture measurements, and so on. The specific I/O components 510 that are included in a particular machine 500 will depend on the type of the machine 500. For example, portable machines such as mobile phones will likely include a touch input device or other such input mechanisms, while a headless server machine will likely not include such a touch input device. It will be appreciated that the I/O components 510 may include many other components that are not specifically shown in FIG. 5. The I/O components 510 are grouped according to functionality merely for simplifying the following discussion and the grouping is in no way limiting. In various embodiments, the I/O components 510 may include input components 518 and output components 520. The input components 518 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components, and the like. The output components 520 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 510 may include communication components 522 operable to couple the machine 500 to a network 524 or devices 526 via a coupling 528 and a coupling 530 respectively. For example, the communication components 522 may include a network interface component or another suitable device to interface with the network 524. In further examples, the communication components 522 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 526 may be another machine or any of a wide variety of peripheral devices. According to various embodiments, the communication components 522 can include a transceiver described herein, a receiver described herein, or both.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Although an overview of the inventive subject matter has been described with reference to specific embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A network device, the network device being a receiving network device comprising a memory and a processor operatively coupled to the memory, the memory storing instructions that cause the processor to perform operations comprising:

receiving a new data unit from a transmitting network device, the new data unit being different from a previous data unit that was previously received by the receiving network device;

determining a data flow associated with the new data unit;

determining a current receive timestamp for the new data unit;

determining, based on the current receive timestamp, a time difference representing a time since reception of a last data unit associated with the data flow;

restarting a timer for the data flow in response to receiving the new data unit from the transmitting network device, the restarted timer causing a dummy data unit process to be performed periodically with respect to a token bucket for the data flow to prevent rollover of a value of a last receive timestamp stored for the data flow, the dummy data unit process being performed in a period of time that is smaller than a largest time value that can be represented by the last receive timestamp, the restarting of the timer comprising setting a time parameter for the data flow to a future time value;

updating a number of accumulated tokens for the data flow based on the time difference and a token accumulation rate for the data flow, the token accumulation rate representing a data rate allowed by the receiving network device for the data flow;

determining whether the data flow is exceeding the data rate based on a data length of the new data unit and the number of accumulated tokens; and setting a state of the data flow to either an exceeds data rate state or a within data rate state based on the determining whether the data flow is exceeding the data rate based on the data length and the number of accumulated tokens, the exceeds data rate state for the data flow causing the network device to not allow the new data unit, and the within data rate state for the data flow causing the network device to allow the new data unit.

2. The network device of claim 1, wherein the setting of the state of the data flow to either the exceeds data rate state or the within data rate state based on the determining whether the data flow is exceeding the data rate based on the data length and the number of accumulated tokens comprises:

in response to determining that the data flow is exceeding the data rate, setting the data flow to the exceeds data rate state.

3. The network device of claim 1, wherein the setting of the state of the data flow to either the exceeds data rate state or the within data rate state based on the determining whether the data flow is exceeding the data rate based on the data length and the number of accumulated tokens comprises:

in response to determining that the data flow is not exceeding the data rate, setting the data flow to the within data rate state.

4. The network device of claim 1, wherein the determining the time difference based on the current receive timestamp comprises:

accessing the last receive timestamp for the data flow, the last receive timestamp representing a last time when the last data unit was received by the receiving network device; and determining the time difference by subtracting the last receive timestamp from the current receive timestamp.

5. The network device of claim 1, wherein the updating of the number of accumulated tokens based on the time difference and the token accumulation rate comprises:

determining an update value by multiplying the time difference by the token accumulation rate; and adding the update value to the number of accumulated tokens.

6. The network device of claim 5, wherein the updating of the number of accumulated tokens based on the time difference and the token accumulation rate comprises:

after adding the update value to the number of accumulated tokens, determining whether the number of accumulated tokens exceeds a predetermined limit; and in response to determining that the number of accumulated tokens exceeds the predetermined limit, setting the number of accumulated tokens to the predetermined limit.

7. The network device of claim 1, wherein the determining whether the data flow is exceeding the data rate based on the data length of the new data unit and the number of accumulated tokens comprises:

comparing the data length of the new data unit to the number of accumulated tokens; and in response to the data length being less than the number of accumulated tokens, determining that the data flow is exceeding the data rate.

8. The network device of claim 1, wherein the determining whether the data flow is exceeding the data rate based on the data length of the new data unit and the number of accumulated tokens comprises:

comparing the data length of the new data unit to the number of accumulated tokens; and in response to the data length being greater than the number of accumulated tokens, determining that the data flow is not exceeding the data rate.

9. The network device of claim 1, wherein the operations comprise:

in response to determining that the data flow is not exceeding the data rate, deducting the data length of the new data unit from the number of accumulated tokens.

10. The network device of claim 1, wherein the operations comprise:

after determining the time difference, storing the current receive timestamp as a new version of the last receive timestamp for the data flow.

11. The network device of claim 10, wherein the new data unit is a first new data unit, wherein the current receive timestamp is a first current receive timestamp, wherein the time difference is a first time difference, wherein the data length is a first data length, and wherein the operations comprise:

receiving a second new data unit from the transmitting network device;

determining that the data flow is associated with the second new data unit;

determining a second current receive timestamp for the second new data unit;

determining, based on the second current receive timestamp, a second time difference representing a time since reception of a new version of the last data unit associated with the data flow;

updating the number of accumulated tokens for the data flow based on the second time difference and the token accumulation rate;

determining whether the data flow is exceeding the data rate based on a second data length of the second new data unit and the number of accumulated tokens; and setting the state of the data flow to either the exceeds data rate state or the within data rate state based on the determining whether the data flow is exceeding the data rate based on the second data length and the number of accumulated tokens.

12. The network device of claim 1, wherein the time difference is a first time difference, wherein the data length is a first data length, and wherein the operations comprise:

periodically performing the dummy data unit process on the number of accumulated tokens for the data flow, the dummy data unit process comprising:

determining a current dummy timestamp based on a current time;

determining, based on the current dummy timestamp, a second time difference between the current dummy timestamp and the last receive timestamp for the data flow, the last receive timestamp representing a last time when the last data unit was received by the receiving network device;

updating the number of accumulated tokens for the data flow based on the second time difference and the token accumulation rate for the data flow;

storing the current dummy timestamp as a new version of the last receive timestamp for the data flow;

determining whether the data flow is exceeding the data rate based on a dummy data length for the dummy data unit and the number of accumulated tokens; and setting the state of the data flow to either the exceeds data rate state or the within data rate state based on the determining whether the data flow is exceeding the data rate based on the dummy data length and the number of accumulated tokens.

13. The network device of claim 1, wherein the new data unit comprises a data packet.

14. The network device of claim 13, wherein the data packet is defined by an IEEE (Institute of Electrical and Electronics Engineers) network standard.

15. A method comprising:

receiving, by a receiving network device, a new data unit from a transmitting network device, the new data unit being different from a previous data unit that was previously received by the receiving network device;

determining, by the receiving network device, a data flow associated with the new data unit;

determining, by the receiving network device, a current receive timestamp for the new data unit;

determining, by the receiving network device and based on the current receive timestamp, a time difference representing a time since reception of a last data unit associated with the data flow;

in response to receiving the new data unit from the transmitting network device, restarting, by the receiving network device, a timer for the data flow that causes a dummy data unit process to be performed periodically with respect to a token bucket for the data flow to prevent rollover of a value of a last receive timestamp stored for the data flow, the dummy data unit process being performed in a period of time that is smaller than a largest time value that can be represented by the last receive timestamp, the restarting of the timer comprising setting a time parameter for the data flow to a future time value;

updating, by the receiving network device, a number of accumulated tokens for the data flow based on the time difference and a token accumulation rate for the data flow, the token accumulation rate representing a data rate allowed by the receiving network device for the data flow;

determining, by the receiving network device, whether the data flow is exceeding the data rate based on a data length of the new data unit and the number of accumulated tokens; and setting, by the receiving network device, a state of the data flow to either an exceeds data rate state or a within data rate state based on the determining whether the data flow is exceeding the data rate based on the data length and the number of accumulated tokens, the exceeds data rate state for the data flow causing the receiving network device to not allow the new data unit, and the within data rate state for the data flow causing the receiving network device to allow the new data unit.

16. The method of claim 15, wherein the setting of the state of the data flow to either the exceeds data rate state or the within data rate state based on the determining whether the data flow is exceeding the data rate based on the data length and the number of accumulated tokens comprises:

in response to determining that the data flow is exceeding the data rate, setting the data flow to the exceeds data rate state.

17. The method of claim 15, wherein the setting of the state of the data flow to either the exceeds data rate state or the within data rate state based on the determining whether the data flow is exceeding the data rate based on the data length and the number of accumulated tokens comprises:

in response to determining that the data flow is not exceeding the data rate, setting the data flow to the within data rate state.

18. The method of claim 15, comprising:

after determining the time difference, storing the current receive timestamp as a new version of the last receive timestamp for the data flow.

19. A non-transitory computer-readable medium comprising instructions that, when executed by a hardware processor of a receiving network device, cause the receiving network device to perform operations comprising:

receiving a new data unit from a transmitting network device, the new data unit being different from a previous data unit that was previously received by the receiving network device;

determining a data flow associated with the new data unit;

determining a current receive timestamp for the new data unit;

determining, based on the current receive timestamp, a time difference representing a time since reception of a last data unit associated with the data flow;

restarting a timer for the data flow in response to receiving the new data unit from the transmitting network device, the restarted timer causing a dummy data unit process to be performed periodically with respect to a token bucket for the data flow to prevent rollover of a value of a last receive timestamp stored for the data flow, the dummy data unit process being performed in a period of time that is smaller than a largest time value that can be represented by the last receive timestamp, the restarting of the timer comprising setting a time parameter for the data flow to a future time value;

updating a number of accumulated tokens for the data flow based on the time difference and a token accumulation rate for the data flow, the token accumulation rate representing a data rate allowed by the receiving network device for the data flow;

determining whether the data flow is exceeding the data rate based on a data length of the new data unit and the number of accumulated tokens; and setting a state of the data flow to either an exceeds data rate state or a within data rate state based on the determining whether the data flow is exceeding the data rate based on the data length and the number of accumulated tokens, the exceeds data rate state for the data flow causing the receiving network device to not allow the new data unit, and the within data rate state for the data flow causing the receiving network device to allow the new data unit.

* * * * *